US005825024A

United States Patent [19]
Badruzzaman

[11] Patent Number: 5,825,024
[45] Date of Patent: Oct. 20, 1998

[54] MULTIDETECTOR PULSED-NEUTRON THROUGH-TUBING CASED-HOLE DENSITY MEASUREMENT SONDE

[75] Inventor: Ahmed Badruzzaman, Anaheim, Calif.

[73] Assignee: Chevron U.S.A. Inc., San Francisco, Calif.

[21] Appl. No.: 816,413

[22] Filed: Mar. 13, 1997

[51] Int. Cl.$^6$ .................................................. G01V 5/10
[52] U.S. Cl. ..................................... 250/269.6; 250/269.7
[58] Field of Search ........................... 250/269.6, 269.7, 250/265, 264, 262, 269.3

[56] References Cited

U.S. PATENT DOCUMENTS

| | | | |
|---|---|---|---|
| 3,156,822 | 11/1964 | Tittman | ............................ 250/269.7 X |
| 4,297,573 | 10/1981 | Smith, Jr. et al. | . |
| 4,574,193 | 3/1986 | Arnold et al. | ......................... 250/269.7 |
| 5,434,408 | 7/1995 | Smith, Jr. et al. | ................ 250/269.6 X |
| 5,627,368 | 5/1997 | Moake | ................................... 250/269.3 |

FOREIGN PATENT DOCUMENTS

| | | | |
|---|---|---|---|
| 457628 | 11/1991 | European Pat. Off. | ............ 250/269.7 |

OTHER PUBLICATIONS

Topical Report—Design of a Case–Hole–Density Logging Tool Phase I, Prepared by Halliburton Energy Services, Houston, TX; Gas research Institute, Exploration and Production Group, Aug. 1995 (GRI–95/0246), pp. 1–30.

Evaluation of Highly Deviated Wells with Gamma Ray/Electric Logs and Cased Hole Density/Neutron Logs, R. A. Haley, Shell Oil Co., and D. L. Kirchoff, Schlumberger Offshore Services, Members SPE–AIME; 1975; Paper No. SPE 5512.

*Primary Examiner*—Edward J. Glick
*Attorney, Agent, or Firm*—W. Keith Turner; Fred E. Hook; John S. Reid

[57] ABSTRACT

An apparatus for measuring the density of a subterranean formation from within a wellbore, especially a cased wellbore. The apparatus has an energy source configured to generate 14 MeV of neutrons in pulses of 20 microseconds or less. The apparatus has at least three detectors for detecting gamma rays which are produced as a result of the neutron pulse. The detectors and energy source are aligned along a central axis with the energy source being at one end. Shielding is disposed between each of the three detectors and between the end detector and the energy source adjacent to it. The detectors are configured to measure gamma rays below 700 KeV and generate a signal in response thereto. The signals may then be compared to predetermined characteristic signals or computer simulations to determine the density, and hence porosity, of the formation.

30 Claims, 4 Drawing Sheets

FIG. 4

MULTIDETECTOR PULSED-NEUTRON THROUGH-TUBING CASED-HOLE DENSITY MEASUREMENT SONDE

FIELD OF THE INVENTION

The invention pertains to apparatus for measuring density in a subterranean reservoir, particularly in a reservoir having a cased wellbore.

BACKGROUND OF THE INVENTION

In petroleum and hydrocarbon production, it is desirable to know the porosity of the subterranean formation which contains the hydrocarbon reserves. This number is essential in calculating the oil saturation and thus the volume of oil in-place within the reservoir. The number is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. One such equation is disclosed in *Petroleum Engineering Handbook*, Society of Petroleum Engineers, 1987, chapter 50, *Nuclear Logging Techniques*, page 50-1. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and visa versa.

Since most older wells are cased and may even have tubing strings in them, the wells where it is particularly desirable to determine the porosity do not lend themselves to the use of existing density tools.

Although at this time no dedicated cased-hole density measurement device exists commercially, devices have been proposed which would use a chemical radioactive source to generate a response signal, similar to the open-hole counterparts which are commercially available. A chemical radioactive source tool would have a limited response due to the more complex borehole environment that generally exists in cased wells, and parameters such as the depth-of-investigation would be limited. The count rates would also be low due to the impedance introduced by the well casing. Increasing the strength of the radioactive source would not be desirable because of the safety concerns of using such a radioactive source. Contamination problems also become a concern when using strong radioactive sources. Additionally, a large number of cased wells contain tubing within the casing. Because of the inability to contact the tool with the side of the wellbore in a wellbore containing tubing, even the chemical radioactive source tools would not work in this situation since the emitted particles will seek a path of low density and therefore migrate into the annulus between the side of the wellbore and the tubing.

Previous methods of measuring density in a borehole, including cased boreholes, consist of using a radioactive chemical source which acts as a constant source of gamma rays to bombard the formation. The gamma rays from the radioactive chemical source are reflected off of atoms within the reservoir at various angles. Sensors or detectors on the tool measure the amount of radiation that is reflected from the formation to the sensors (known as "back-scattering"). Given that gamma ray scattering tends to be very "forward peaked" (i.e., following a scattering collision they continue to move in a direction closer to their direction prior to the collision than in a direction opposite to it), only a small number of the gamma rays originating in the sonde will be reflected back towards the sonde to be detected by the detection system that is resident in the sonde. Since the radioactive chemical source is constantly generating gamma rays, a high concentration (measured in Curies) source cannot be used for safety reasons. Therefore, a relatively low concentration chemical source must be used thereby limiting the number of gamma rays that can be projected into the formation and reflected from the formation to the sensors. Furthermore, as described above, the casing and tubing within the wellbore causes further attenuation of the signal. It is therefore extremely difficult to determine reservoir density characteristics in cased wells and through tubing using current methods for well logging.

It is therefore desirable to have a reservoir density measurement tool which is capable of operating in a cased wellbore and in particular a cased wellbore having a tubing string.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 1:
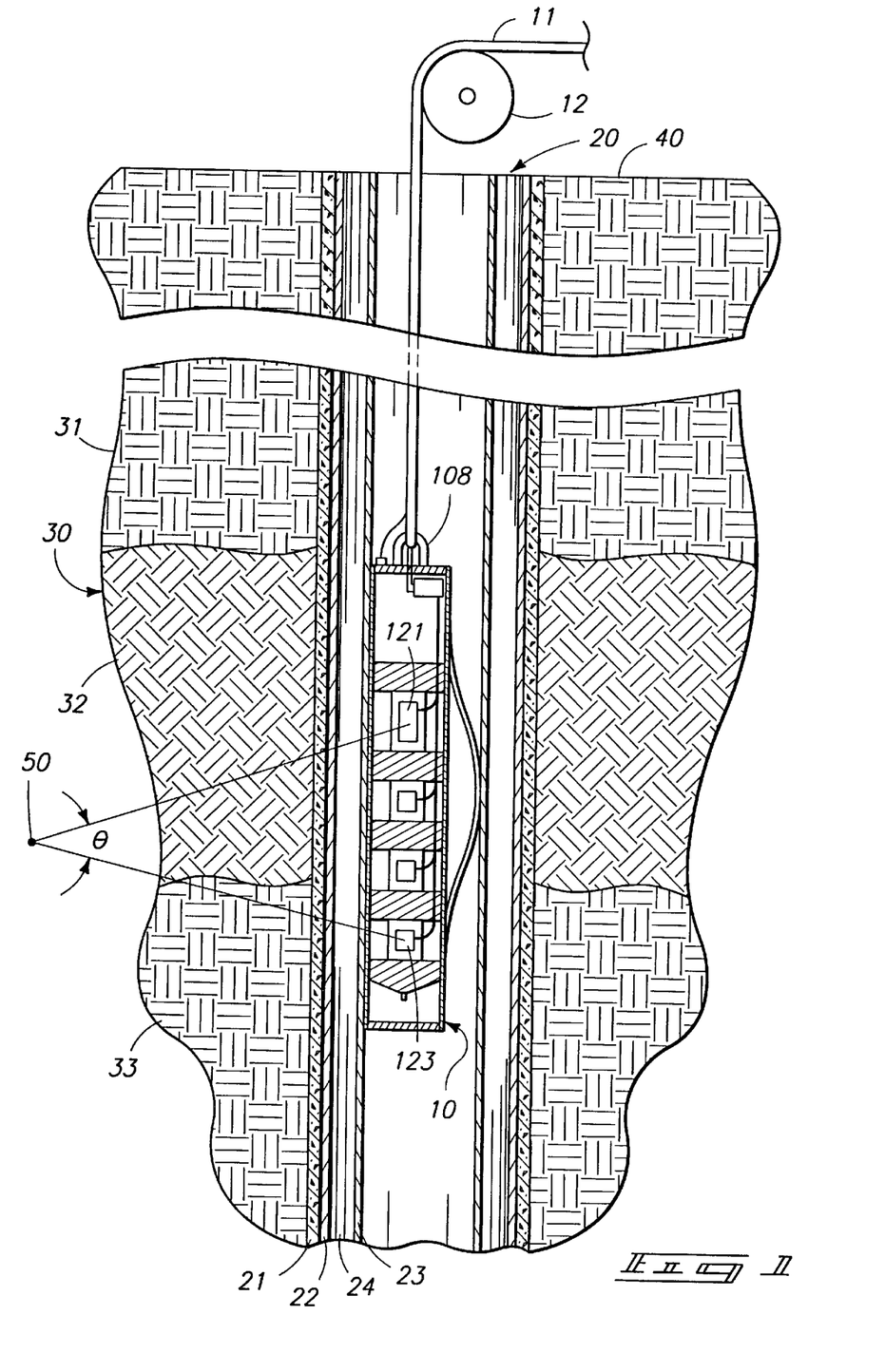
FIG. 1 is an environmental view showing the apparatus of the present invention inserted into a subterranean formation.

FIG. 1 is an environmental view showing the apparatus 10 of the present invention situated in a wellbore 20 in a subterranean reservoir 30, alternately known as a "formation." Subterranean reservoir 30 consists of various lithologies, represented by strata 31, 32 and 33, having differing densities and perhaps containing hydrocarbons. It is the measurement of the densities of the various lithologies in the subterranean reservoir 30 which is the objective of the apparatus 10 of the present invention. The apparatus 10 may alternately be known as a logging tool, a density logging tool, a sonde, or, more particularly, a through-tubing cased-hole density measurement sonde. The sonde is lowered and raised within the wellbore 20 for example by the cable 11 via draw works 12. Cable 11 provides a strengthened cable for suspending the apparatus in the wellbore, as well as for electrical conductors for power and signal lines and other control lines and telemetry for the apparatus. The apparatus may be used in an application where the sonde 10 is located within the tubing 23. The sonde is preferably designed to be thin enough to fit within most tubing strings. The apparatus may also be used in a more conventional manner adjacent to the casing where there is no tubing or by lowering the tool through the bottom of the tubing to a point where it may contact the casing. Preferably, the sonde is less than 2 inches (52 mm) in diameter in order to allow it to be used in a well having a tubing string. More preferably, the sonde is 1 and 11/16 inches in diameter.

In the typical use, the sonde 10 is lowered into the wellbore by cable 11 which is mounted on a cable reel which is in turn mounted to a truck or the like (not shown). Once the sonde has been lowered to the desired depth, it is pulled at a constant rate towards the surface. The sonde may either be continuously pulled while measurements are made or stopped at intervals to allow static measurements to be made.

The sonde of the present invention is configured such that energy from the sonde advantageously penetrates tubing 23, the annular space 24 between the tubing and the steel casing 22, the steel casing 22, and the cement lining 21 and still have sufficient magnitude to generate a response from the reservoir useful in determining the density of the reservoir.

Apparatus Overview

Figure 2:
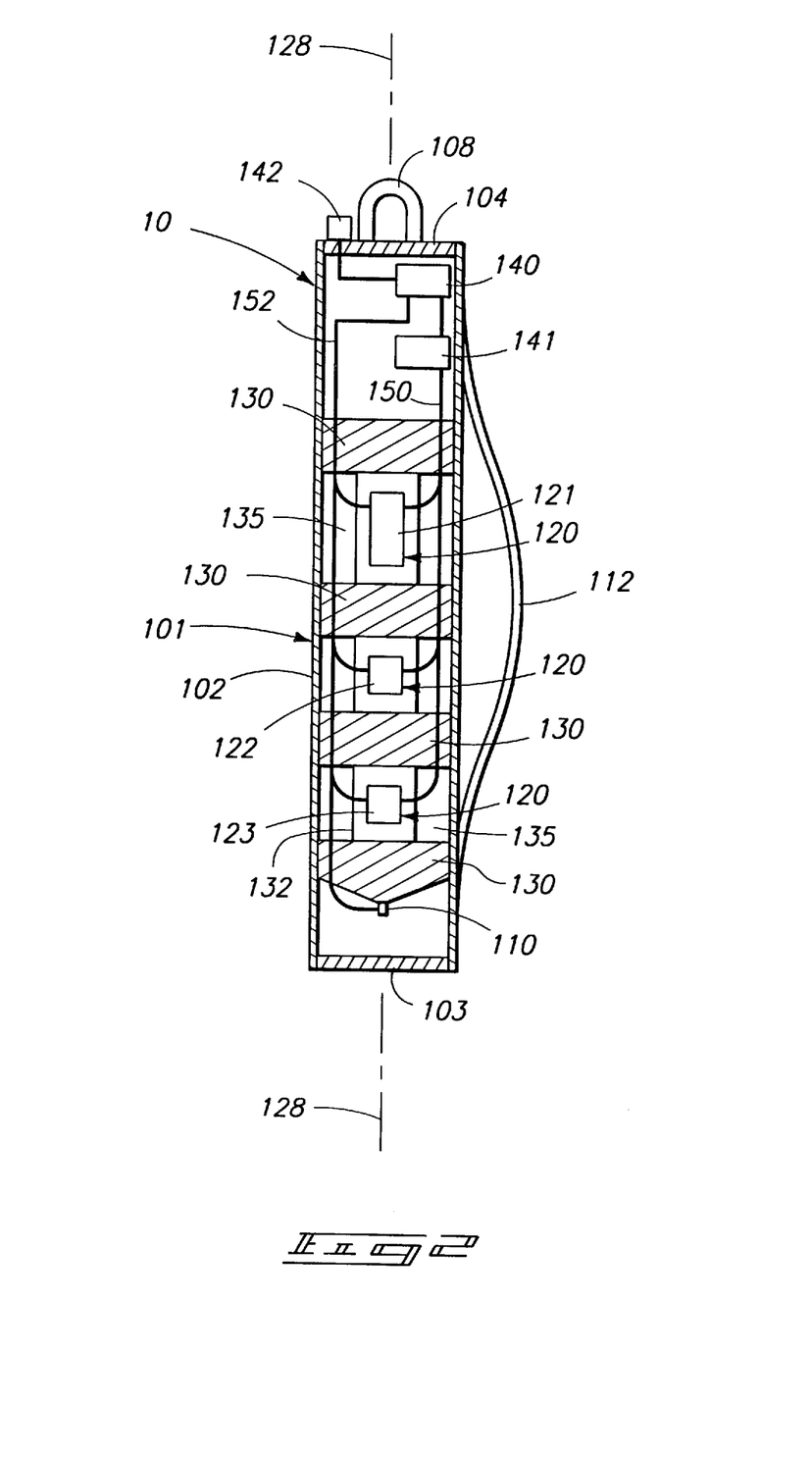
FIG. 2 is a sectional elevation view of the apparatus of the present invention showing a sonde having three (3) detectors.

Turning now to FIG. 2, a side sectional view of a sonde 10 of the apparatus of the present invention is shown. The sonde advantageously has a housing 101 which is preferably a cylindrical housing having housing sides 102, a housing bottom 103, and a housing top 104. Due to the harsh environment commonly encountered within a wellbore, the housing is preferably made from a corrosion resistant material such as chromium alloy steels, more commonly known as stainless steel. The particular selection of material for the housing may vary depending on the environment which the sonde is expected to encounter in use. In some environments a nickel alloy may be preferable. As discussed above, the sonde is also preferably of a relatively slim diameter so that it may be inserted into wellbores having tubing strings in place. A housing diameter of less than 52 mm (2 inches) is desirable.

The apparatus 10 advantageously includes a draw works connector 108 which is attached to the top of the housing 104. The sonde 10 additionally preferably includes an electrical and electronics connector 142 which is configured to receive power, control, and signal lines which are typically incorporated in the cable 11, as shown in FIG. 1. Cable 11 may attach to draw works connector 108 to allow the sonde to be lowered and raised within borehole 20 as described above.

The invention advantageously further included a non-chemical energy source 110 disposed within the housing 101 and which is used to generate neutrons which may impinge upon nuclei within the reservoir thereby generating a reactive event which will be used as the signal to assist in determining the density of the reservoir. Rather than operate in a continuous mode as have radioactive chemical sources in the past, the non-chemical energy source 110 of the present invention preferably operates in a pulsed mode so that energy is generated for only a short duration of time allowing high energy to be produced which will in turn produce a better response signal. The energy source 110 is preferably a neutron generator. More preferably, the energy source is a neutron generator capable of producing at least approximately 14 million electron volts (MeV) for short durations of time. Preferably, the short durations of time are pulses between 15 and 20 microseconds ($\mu$sec.). The design of the energy source is more fully described below.

Still referring to FIG. 2, the apparatus of the present invention advantageously includes sensors 120 for detecting the response event generated within the reservoir as a result of the energy pulse produced by the neutron generator. The sensors may alternately be known as detectors. The apparatus preferably has at least three detectors 120 and more preferably has at least four detectors 120. The detectors are configured to receive radiation from the response event which occurs in the reservoir as a result of the neutron pulse from the energy source 110 and generate a signal in response thereto.

The detectors 120 and neutron generator 110 are preferably configured within the housing 101 such that the neutron generator is separated from the sensors, and each sensor is separated from the other sensors, by shielding 130. One advantage of using multiple detectors or sensors in a spaced-apart configuration is that the reactive event generated by he pulse of neutrons is generated for every medium the neutrons encounter, including the reservoir, the casing, the cement, the tubing, and even the apparatus itself. I will hereinafter refer to all of these components collectively as "the system," which is understood to include the formation itself. The reactive event generated by the collision of neutrons with the components of the system is the generation of gamma rays. By using multiple detectors, some detectors will receive mostly those gamma rays generated by collisions with non-reservoir nuclei (e.g., nuclei in the tubing, the casing and the apparatus itself). Other detectors will receive signals which include those gamma rays as well as gamma rays born within the formation as a result of the collisions with the neutrons. The signal from the detector which receives gamma rays primarily from non-reservoir nuclei may then be subtracted from the signal at a detector which receives gamma rays from reservoir nuclei as well as non-reservoir nuclei to leave a signal indicative mostly of gamma rays born within the formation. These are the gamma rays that are of particular interest in determining the density and hence the porosity of the formation.

The design and details of the detectors and shielding are more fully described below.

The apparatus preferably further includes an electrical power supply 140 and control electronics 141 as more fully described below.

In the operation of the apparatus of the present invention, the neutron generator 110 is pulsed for a short period of time, preferably between 15 and 20 $\mu$sec., at a relatively high energy of approximately 14 MeV. As the neutrons enter the formation, they collide with the atoms of the formation material causing the elements therein to give off characteristic gamma rays. For example, carbon will give off gamma rays at about 4.4 MeV, while oxygen will produce gamma rays at about 6.13 MeV as a result of collisions with the neutrons. These characteristic gamma rays will continue to propagate in the formation and borehole and collide with other elements in the system, slowing them down until they are at very low energies. The gamma rays produced by these collisions which are of interest in the present invention are below about 700,000 electron volts (700 KeV). This is a fundamental difference from conventional designs which rely on back-scattering gamma rays produced by a radioactive chemical source in the sonde to produce a signal relating to the density of the formation. In the present invention, the energy which is measured is born in the formation as a result of the neutrons colliding with the nuclei in the formation and slowing down. In previous designs, the count rate of the energy reflected from the formation increases as the density of the formation decreases; in the present invention, the count rate of generated gamma rays may increase or decrease as the density increases, depending on the source-detector spacing.

The present design therefore produces a much higher count rate than prior designs, providing a much stronger response event within the formation, ensuring that the resulting signal will not be masked by ambient or environmental effects, including gamma rays produced by collisions with non-reservoir nuclei. The relatively large amount of energy input into the formation by the neutron generator 110 also allows for deeper penetration and investigation into the formation.

Energy Source

Figure 3:
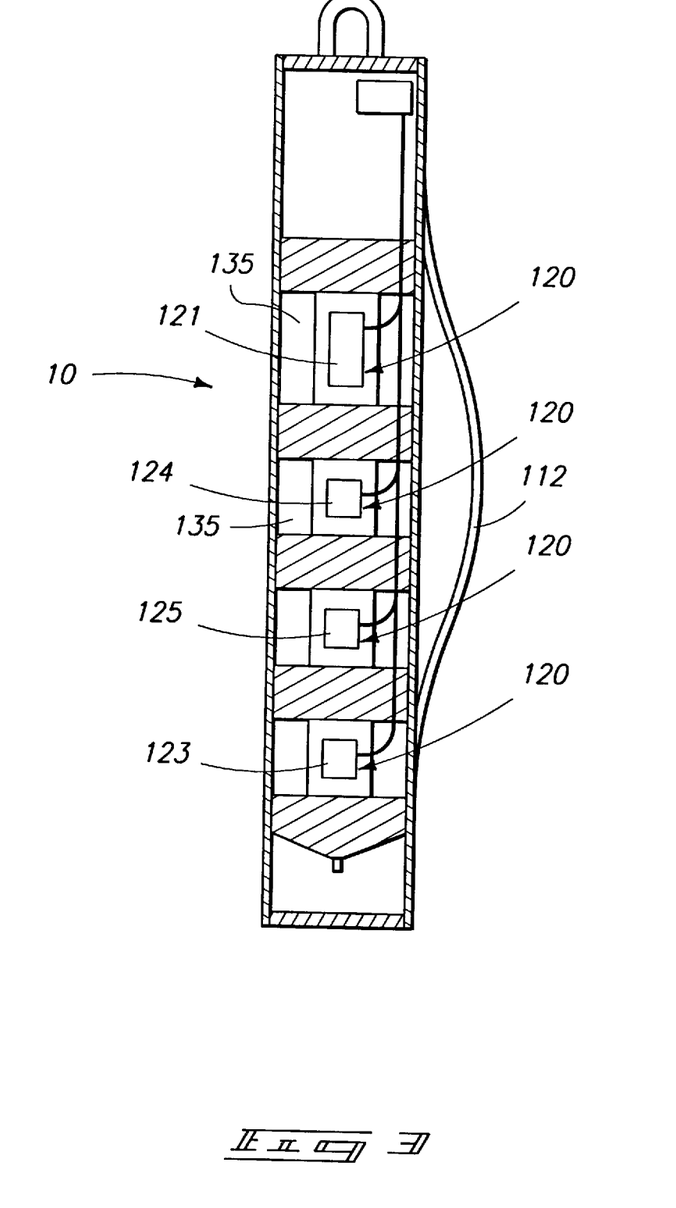
FIG. 3 is an elevation sectional view of the apparatus of the present invention showing a sonde having four (4) detectors.

The sonde 10 of the present invention advantageously includes an energy source 110 for generating neutrons, as shown in FIGS. 2 and 3. When the sonde is placed in the wellbore, the generated neutrons are impinged upon the reservoir material, or more precisely, on the nuclei of the reservoir materials, or "reservoir nuclei" (as well as the other components in the system, i.e., the wellbore and the apparatus, as described above) to generate an event producing radiation which may be detected and converted to an electrical signal which may be correlated to the density of the reservoir, and hence the reservoir porosity.

The energy source is preferably a non-chemical energy source. More preferably, the energy source is a neutron generator. The neutron generator should be capable of producing at least 14 MeV of neutrons over a period of time of no less than 15 $\mu$sec., preferably no more than 20 $\mu$sec., and more preferably for between 15 and 20 $\mu$sec.

The neutron generator is preferably powered by electricity which may be provided to the sonde via cable 11. Since the neutron generator preferably only generates neutrons for the short period of time described, between the power source from the cable 11 and the neutron generator, there is advantageously provided a timing and control circuit 141, as shown in FIG. 2. The timing and control circuit is used to control the duration of the energy bursts or pulses of neutrons produced by the neutron generator, as well as the period of time between pulses. In this manner, the neutron generator is operated in a pulsed manner to provide pulses or bursts of neutrons into the reservoir. The operation of the timing and control circuit 141 is more fully described below.

Detectors

As seen in FIG. 2, the apparatus 10 of the present invention is advantageously provided with at least three (3) detectors 120, an upper detector 121, a middle detector 122, and a lower detector 123.

The detectors preferably are scintillation detectors provided with a scintillator selected from the group of materials consisting of sodium iodide, gadolinium orthosilicate, and bismuth germanate. Preferably the detector is selected from the group of materials consisting of gadolinium orthosilicate (gso) and bismuth germanate (bgo). Due to the relatively low thermal stability of bismuth germanate, when bismuth germanate is used as the detector material, a thermal jacket or heat shield 132 is preferably provided around the detector to prevent ambient heat within the subterranean formation from damaging the detector.

Turning to FIG. 3, the apparatus 10 of the present invention more preferably includes at least four (4) detectors 120, an upper detector 121, a lower detector 123, a mid-upper detector 124, and a mid-lower detector 125.

Since the affect of the high energy burst from the neutron generator into the formation is to cause gamma rays to be generated within the system (including the formation) as described above, it is desirable to have a large number of detectors spread over a relatively long distance, since the generated gamma rays will be propagated in all directions.

The longer the spacing between the upper sensor 121 and the lowermost sensor 123, the larger is the angle over which gamma rays that are generated will be detected. Using the point of generation within the formation as the apex of the angle, it can easily be seen by triangulation for a fixed angle that by connecting the upper and lower detectors to the point of generation in the formation, larger spacing between the upper detector 121 and the lower detector 123 allows for gamma rays generated at points farther within the formation to be detected. This is clearly shown in FIG. 1 where gamma rays from the point 50 within the formation are generated and detected by detectors 121 and 123. As the distance between detectors 121 and 123 is increased, the angle 0 over which gamma rays are detected will also increase as the location of point 50 remains fixed.

In the present invention, the distance between the uppermost detector 121 and the lowermost detector 123 is preferably on the order of about 0.5 meters (1.5 feet). Longer sondes may be produced, including sondes having more than four detectors, thus allowing for even greater distances between the upper and lower detector. However, handling difficulties with very long sondes may impose a practical limit on the length of the sonde. The spacing between the source 110 and lowermost detector 123 of FIG. 2 is preferably on the order of about 10 cm (4 inches). Such spacing is useful in assuring that the gamma rays originating from non-formation components of the system near the apparatus are measured. As explained, the signal from these gamma rays must be subtracted from the overall signal in order to distinguish the signal originating from the formation only.

The detectors 120 and the neutron generator 110 are preferably axially aligned along the central longitudinal axis of the cylinder which comprises the housing 101.

Advantageously disposed between the neutron generator 110 and the lowermost detector 123 is shielding 130. Shielding is likewise preferably disposed between each of the detectors and between the uppermost detector 121 and the top of the sonde 104. The shielding aids in preventing the migration of neutrons from the sonde to the detectors 120 which may contribute to false signals being received by the detectors 120. Shielding between detectors also prevents migration of gamma rays between one detector and another. Preferably, the shielding material is primarily made out of tungsten or a tungsten alloy.

The detectors are configured to generate an electrical signal in response to receiving gamma rays generated within the system as a result of the pulsed energy from the neutron generator 110. The detectors are preferably provided with an electrical potential such that when a gamma ray impinges on the detector, an electric signal or signal event is produced by the detector.

Depending on the particular detector selected for use in the apparatus, electric power may be required to power the detector. Electric power may advantageously be provided to the detectors 120 by detector power conductor 152 which is in turn connected to power supply 140, as shown in FIG. 2.

Electrical signals produced by the detectors 120 are advantageously communicated to the timing and control circuit 141 by signal conductors (also known as signal wires) 150.

Preferably, the control electronics 141 include an amplification circuit used to amplify the electrical signal generated by the detectors before it is sent to the signal connector 142 to be communicated up-hole by cable 11. The amplification circuit in control electronics 141 may advantageously include a filter circuit for filtering the signal produced by the detectors either prior to or after amplification and before being conducted to the signal or electronics connector 142. The control and electronics circuits are more fully described below.

Electrical and Electronic Controls

Figure 4:
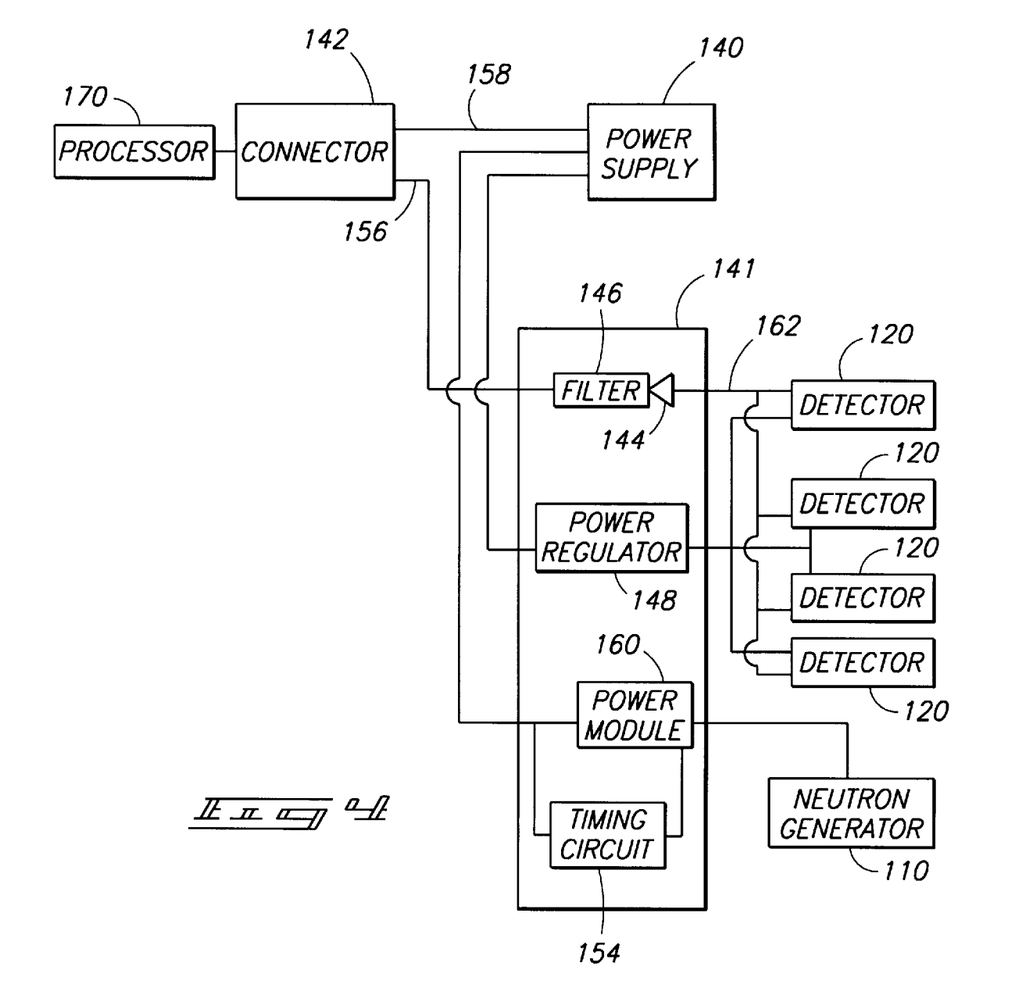
FIG. 4 is a schematic of the electrical and electronic circuit for the apparatus.

Referring now to FIG. 4, the apparatus is advantageously further provided with an electronics and electrical power circuit.

Electrical power is provided to power supply 140 via power line 158 which is in turn connected to electrical/electronic connector 142. Electronic and electrical connector 142 may be coupled to cable 11 of FIG. 1 so that power may be provided from a surface source (not shown).

Power supply 140 preferably provides power to detector power regulator 148 which may in turn provide electrical power to detectors 120 to facilitate the generation of an electrical signal in response to inputs of gamma rays received by the detectors. Power supply 140 may also provide power to generator power module 160. The release of energy from generator power module 160 to neutron generator 110 is advantageously controlled by timing circuit 154 which, as described above, limits the duration of pulses of power to the neutron generator to between about 15 and 20 μsec. Timing circuit 154 may also be configured to allow adjustment to vary the time between pulses. The time between pulses is dependent upon the rate at which information is desired to be logged from the formation and physical constraints on the rate at which the apparatus may be pulled through the wellbore in the formation.

Advantageously connected to the electrical and electronic connector 142 is the signal output line 156. Signal output line 156 receives the signals which are produced by detectors 120 in response to receiving gamma rays generated within the formation as a result of a pulse from the neutron generator 110. Electrical response signals from detectors 120 are advantageously communicated to the control electronics 141 by signal communication line 162. The signal generated by the detectors 120 may further be modified by amplifier 144 and may also be further modified by filter 146 before being communicated to the electronic connector 142.

Operation of the Apparatus

In the operation of the apparatus, the sonde 10 of FIG. 1 is lowered into a wellbore 20 which may contain a tubing string 23 or may merely be cased by casing 22. Once the sonde has been lowered to a depth where it is desired to begin collecting information, the sonde is pulled toward the surface by for example draw works 12 and cable 11.

Electrical power is preferably provided to the electrical and electronics connector 142 by cable 11. A portion of the electrical power is advantageously directed to the neutron generator 110 of FIG. 2. The length of time during which power is actually applied to neutron generator 110 is controlled by the control electronics 141. The neutron generator is activated for short pulses, each pulse preferably lasting for a duration of between 15 and 20 μsec. During this period of activation, the neutron generator preferably produces about 14 MeV.

As the neutrons generated by the neutron generator enter the formation 30, they will inelastically collide with nuclei in the formation and produce characteristic gamma rays, which in turn slow down as a result of the Compton scattering effect. It is these secondary gamma rays, and in particular those having energies on the order of about 700 KeV or lower, that are of interest in the present invention. As the gamma rays propagate from their points of generation, they may be detected by detectors 120. Detectors 120 produce electrical signals or response signals in proportion to the quantity of gamma rays detected by the detector. The detectors communicate the response signals to the control electronics 141. The response signals may be amplified and filtered in the control electronics 141 before they are communicated to the electronics connector 142. A signal line within cable 11 advantageously communicates the resultant signals from the detectors up-hole where the signals may be recorded or otherwise processed by signal processor 170.

A separate or distinct signal line for each detector may be deployed. Alternately, the data may be stored in the electrical control circuit 141 and sent up-hole on a single multiplexed signal line.

The apparatus 10 is drawn upward within the wellbore 20 in either a continuous or staggered manner depending on the logging characteristics desired. As the sonde 10 is pulled up the wellbore, the neutron generator will continue to operate in a pulsed manner so as to generate response events (gamma rays) in the reservoir which may be converted to response signals by the detectors. In this manner, a relatively continuous stream of data regarding density characteristics of the reservoir may be recorded over the desired interval of the formation 30.

It is understood that the apparatus of the present invention may also be configured to measure gamma ray responses above 700 KeV while still measuring gamma ray responses below 700 KeV. By observing peaks in energy levels at 4.4 MeV and 6.13 MeV, it is known that the carbon to oxygen ratio may be obtained. This information is useful in identifying the ratios of water to hydrocarbon present within the formation. This information can then be used with the information derived from the signals below 700 KeV to obtain a more complete "picture" of the reservoir.

Method of the Present Invention

The invention further includes a method for measuring the density of a subterranean formation from within a cased wellbore.

In the method, an energy source capable of generating at least 14 MeV of neutrons is introduced into the wellbore. The energy source is preferably activated for a period of not more than 20 μsec during which time the energy source preferably generates at least 14 MeV of neutrons. Following the generating of the neutrons by the energy source, a portion of the gamma rays produced within the system as a result of bombardment by the neutrons from the energy source are detected. Of the gamma rays detected, those that are below about 700 KeV are of interest in the present method. Preferably, gamma rays produced by the reaction from each pulse of the neutron source are detected at at least three locations within the wellbore. More preferably, gamma rays are detected at at least four locations within the wellbore. The gamma rays are advantageously detected at the various locations within the wellbore over the same period of time. Preferably, gamma rays are detected at locations aligned along a central axis to facilitate later calculations.

For each location at which gamma rays are detected within the wellbore, a response signal proportional to the amount of gamma rays detected at the particular location is generated. The response signals may then be electronically and/or mathematically processed to determine characteristics of the subterranean formation, especially information pertaining to density, porosity, and lithology of the formation.

Preferably, the response signals are compared to reference signals which correspond to known density values and/or lithologies. In this manner by matching like response signals to like reference signals, it is possible to determine the density and/or lithology of the formation being investigated.

More preferably, the response signals are amplified to allow them to be conducted from the point of generation within the wellbore to a point on the surface where they may be recorded and/or further processed. The response signals may also advantageously be electronically filtered to remove spurious signals. The resultant filtered signal may then be further processed as described herein.

In another embodiment of the method through computer simulation, calculation, and/or laboratory and/or field testing, it is possible to determine the relationship between density and/or lithology of the formation and the signal generated by the detector. For different detector materials, different signals may be generated which should be taken into account in these calculations and/or simulations. In this manner, mathematical relationships correlating densities and lithologies as a function of signal generated are provided. Signals may then be processed mathematically using these derived, known mathematical formulas to produce numerical values representative of the density and hence porosity of the formation being investigated.

In another embodiment of the method, the energy pulse from the neutron generator is preferably generated for a period of not less than 15 $\mu$sec. In yet another embodiment of the invention, the energy from the neutron generator is preferably generated for a period of between 15 and 20 $\mu$sec.

Once the density of the formation has been determined, the porosity may be determined by using known correlations between density and porosity to calculate the porosity. Therefore, the method of the present invention further includes a method for determining the porosity of a subterranean formation by determining the density of the formation in any one of the aforementioned novel methods, and then calculating porosity using known density-porosity correlations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. Apparatus for measuring density of a subterranean formation from within a wellbore, comprising:
    a non-chemical energy source configured to be activated in a pulsed manner so as to generate within said formation gamma rays below 700 thousand electron volts (KeV);
    at least three detectors configured to detect said gamma rays and generate electrical signal in response thereto, said energy source and said detectors being essentially axially aligned;
    shielding, said shielding disposed between said energy source and said detectors and between each of said detectors, said shielding configured to shield said detectors from gamma rays not generated within said formation as a result of said energy source being pulsed; and
    a signal processor said signal processor configured to process said electrical signals to produce a measurement of said density of said formation.

2. The apparatus of claim 1 further comprising
    a signal connector;
    signal conductors in electrical communication with said detectors and said signal connector for conducting said electrical signals to said signal connector.

3. The apparatus of claim 1 wherein said non-chemical energy source is a neutron generator.

4. The apparatus of claim 3 wherein said neutron generator emits at least 14 million electron volts (MeV) neutrons when said neutron generator is activated in said pulsed manner.

5. The apparatus of claim 4 wherein said neutron generator is activated in a pulsed manner such that said energy source generates neutrons during a pulse having a duration not exceeding 20 microseconds.

6. The apparatus of claim 3 wherein said detectors comprise a detecting material selected from the group consisting of sodium iodide, gadolinium orthosilicate and bismuth germanate.

7. The apparatus of claim 6 wherein each of said detectors comprise a detecting material of bismuth germanate and each of said detectors further comprises a heat shield surrounding said detecting material, said heat shield configured to reduce flux of ambient heat into said detecting material.

8. The apparatus of claim 7 wherein said heat shield is made primarily of a tungsten alloy.

9. The apparatus of claim 8 wherein said energy source and said detectors are essentially aligned along an axis such that said energy source is disposed at a first end of said axis.

10. The apparatus of claim 1 having at least four detectors.

11. Apparatus for measuring density of a subterranean formation from within a wellbore, comprising:
    a cylindrical housing, said housing having a central longitudinal axis;
    a neutron generator disposed within said housing, said neutron generator configured to be activated in a pulsed manner;
    at least three detectors, said detectors disposed within said housing and configured to detect gamma rays below 700 thousand electron volts (700 KeV) and generate electrical signals in response thereto, said neutron generator and said detectors being essentially aligned within said housing along said central axis;
    a signal processor, said signal processor configured to process said electrical signals to produce a measurement of said density of said formation; and
    shielding, said shielding disposed between said neutron generator and said detectors and between each of said detectors, said shielding configured to shield selected ones of said detectors from gamma rays not generated within said formation as a result of said neutron generator being pulsed.

12. The apparatus of claim 11 further comprising:
    a signal connector;
    signal conductors in electrical communication with said detectors and said signal connector for conducting said electrical signals to said signal connector;
    a signal amplifier, said signal amplifier disposed between said detectors and said signal connector and configured to receive and amplify said electrical signals from said detectors;
    a timing circuit, said timing circuit configured to activate said neutron generator in said pulsed manner; and
    a power supply, said power supply configured to supply power to said timing circuit and said signal amplifier.

13. The apparatus of claim 11 wherein said detectors comprise a detecting material selected from the group consisting of sodium iodide, gadolinium orthosilicate, and bismuth germanate.

14. The apparatus of claim 11 wherein the outside diameter of said housing is less than 52 millimeters.

15. The apparatus of claim 11 wherein said housing is made primarily of a chromium alloy steel.

16. The apparatus of claim 11 wherein said neutron generator is activated in a pulsed manner such that said neutron generator generates neutrons for a period not exceeding 20 microseconds.

17. The apparatus of claim 11 wherein said neutron generator is activated in a pulsed manner such that said neutron generator generates neutrons for a period not less than 15 microseconds.

18. The apparatus of claim 11 wherein said neutron generator is activated in a pulsed manner such that said neutron generator generates neutrons for a period of between 15 and 20 microseconds.

19. The apparatus of claim 11 wherein said neutron generator emits approximately 14 MeV neutrons when activated.

20. Method for generating a signal representative of the density of a subterranean formation from within a wellbore, comprising:

generating a pulse of at least 14 MeV neutrons within said wellbore for a period of not more that 20 microseconds; and following the generating of said neutrons, detecting gamma rays below 700 KeV at at least three locations within said wellbore at approximately the same instant in time, generating a response signal proportional to said gamma rays detected at said locations said response signal representative of said density of said formation.

21. The method of claim 20 wherein said gamma rays are detected at at least four locations.

22. Method for measuring density of a subterranean formation from within a wellbore, comprising:

introducing within said wellbore a source of neutrons capable of generating at least 14 MeV neutrons;

generating a pulse of at least 14 MeV neutrons within said wellbore for a period of not more that 20 microseconds;

following the generating of said neutrons, detecting gamma rays below 700 KeV at at least three locations within said wellbore at approximately the same instant in time;

for each said location, generating a response signal in proportion to said detected gamma rays; and comparing said response signals to reference signals, said reference signals corresponding to known density values, to determine the densities corresponding most nearly to said response signals.

23. The method of claim 22 wherein said gamma rays are detected at at least four locations.

24. The method of claim 22 wherein said response signals are filtered prior to being compared to produce filtered signal comprised essentially of response signals resulting from gamma rays generated within said formation as a result of said neutron pulse.

25. Method for measuring density of a subterranean formation from within a wellbore, comprising:

introducing within said wellbore a source of neutrons capable of generating at least 14 MeV neutrons;

generating a pulse of at least 14 MeV neutrons within said wellbore for a period of not more than 20 microseconds;

following the generating of said neutrons, detecting gamma rays below 700 KeV at at least three locations within said wellbore at approximately the same instant in time;

for each said location, generating a response signal in proportion to said detected gamma rays; and determining the density of said formation by mathematically converting said response signals into numerical values representative of densities, using known mathematical formulas.

26. The method of claim 25 wherein said pulse of neutrons is generated for between 15 microseconds and 20 microseconds.

27. Method for determining porosity of a subterranean formation, comprising:

introducing within a wellbore within said formation a source of neutrons capable of generating at least 14 MeV neutrons;

generating a pulse of at least 14 MeV neutrons within said wellbore for a period of not more than 20 microseconds;

following the generating of said neutrons, detecting gamma rays below 700 KeV at at least three locations within said wellbore at approximately the same instant in time;

for each said location, generating a response signal in proportion to said detected gamma rays;

determining the density of said formation by mathematically converting said response signals into numerical values representative of densities, using known mathematical formulas; and determining the porosity of said formation by applying known mathematical formulas correlating density to porosity using said determined density.

28. Apparatus for measuring density of a subterranean formation from within a wellbore, comprising:

a non-chemical energy source configured to be activated in a pulsed manner so as to generate within said formation gamma rays below 700 thousand electron volts (KeV);

at least three detectors configured to detect said gamma rays and generate an electrical signal in response thereto, said energy source and said detectors being essentially axially aligned; and I shielding, said shielding disposed between said energy source and said detectors and between each of said detectors, said shielding configured to shield said detectors from gamma rays not generated within said formation as a result of said energy source being pulsed, and wherein at least one of said detectors further comprises a heat shield surrounding said one of said detectors, said heat shield configured to reduce flux of ambient heat into said one of said detectors.

29. The apparatus of claim 28 wherein said heat shield is made primarily of a tungsten alloy.

30. The apparatus of claim 28 wherein said at least one detector comprises a detecting material of bismuth germanate.

* * * * *